Figure 1:
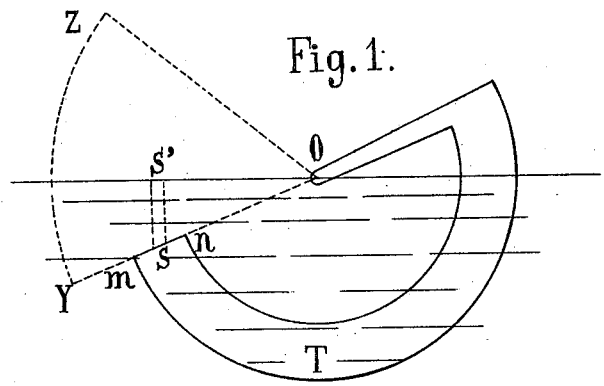

E. GIBAUDAN & A. J. FRAGER.
ALCOÖMETER.
APPLICATION FILED JULY 24, 1911.

1,102,905.

Patented July 7, 1914.
5 SHEETS—SHEET 1.

E. GIBAUDAN & A. J. FRAGER.
ALCOÖMETER.
APPLICATION FILED JULY 24, 1911.

1,102,905.

Patented July 7, 1914.
5 SHEETS—SHEET 2.

E. GIBAUDAN & A. J. FRAGER.
ALCOÖMETER.
APPLICATION FILED JULY 24, 1911.

1,102,905.

Patented July 7, 1914.
5 SHEETS—SHEET 3.

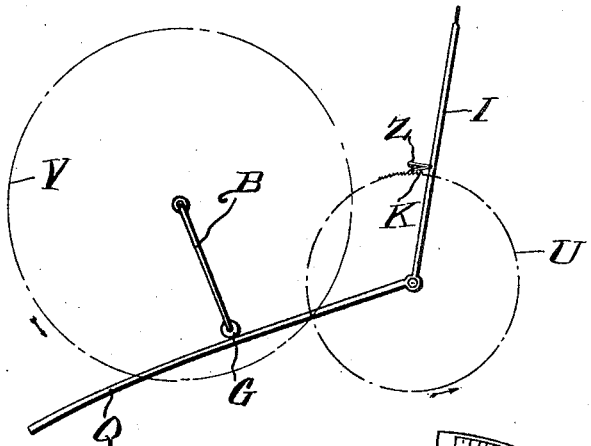
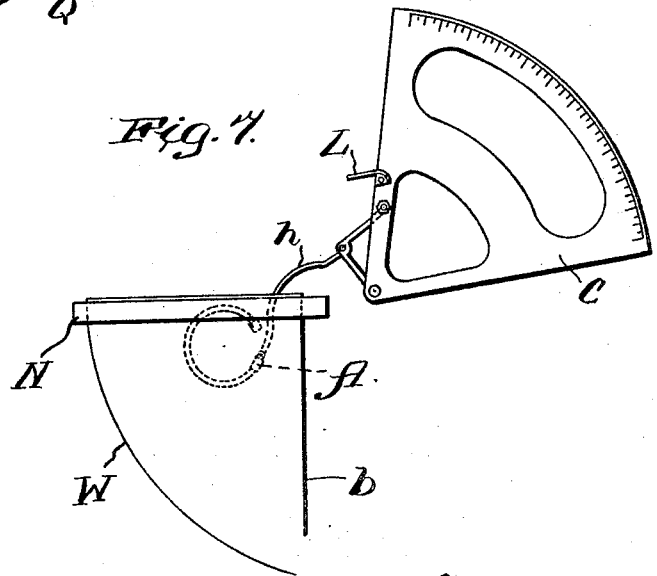
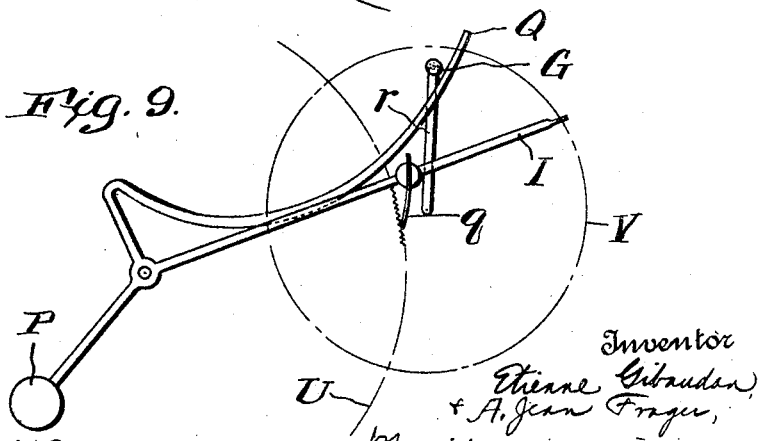

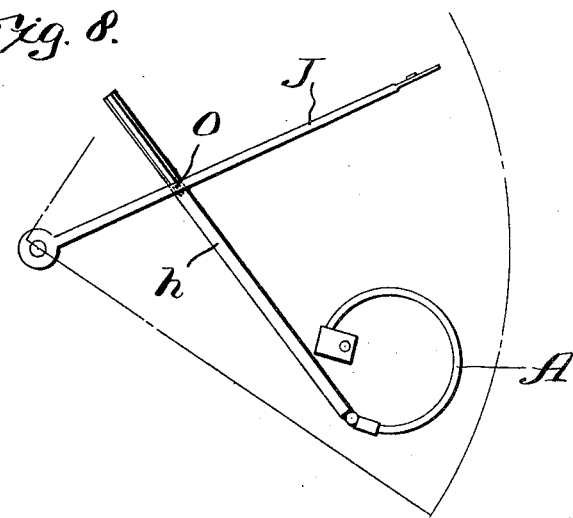
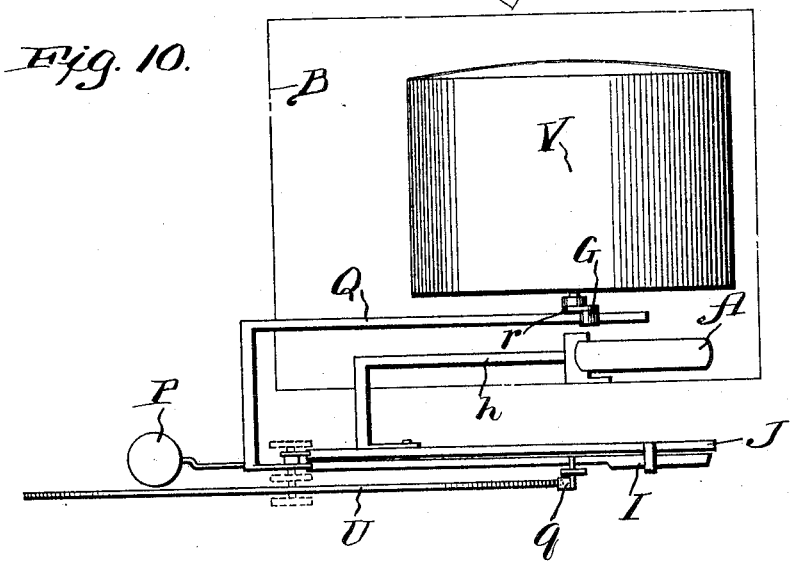
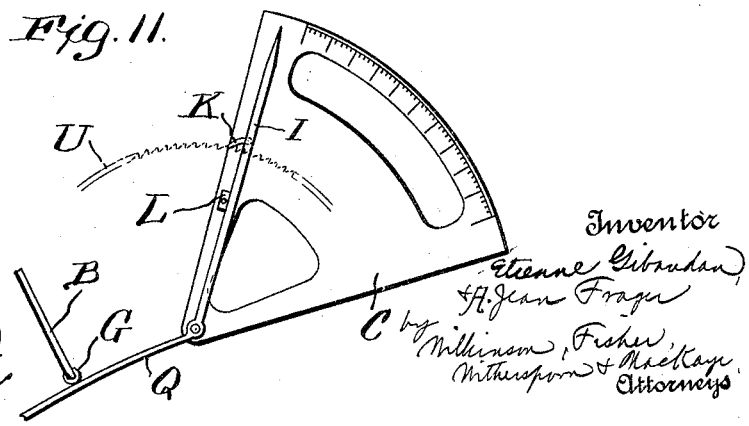

UNITED STATES PATENT OFFICE.

ETIENNE GIBAUDAN, OF CHATEAU DE-LA-COUPE, NEAR NARBONNE, AND ALPHONSE JEAN FRAGER, OF PARIS, FRANCE.

ALCOÖMETER.

1,102,905.  Specification of Letters Patent.  Patented July 7, 1914.

Application filed July 24, 1911. Serial No. 640,198.

*To all whom it may concern:*

Be it known that we, ETIENNE GIBAUDAN and ALPHONSE JEAN FRAGER, citizens of the French Republic, and residing, respectively, at Chateau de-la-Coupe, near Narbonne, Aude, France, and at 20 Rue de Tournon, Paris, France, have invented new and useful Improvements in Alcoömeters, of which the following is a specification.

The present invention relates to an alcoömeter, that is, an apparatus which adds up on its dial the different quantities of pure alcohol contained in distillates of varying strength passing through the apparatus.

The apparatus comprises three essential features, a rotary volant for measuring the volume, an alcoömetric float for determining the degree of strength, and a thermometer for making corrections due to variations in temperature.

In the following description the terms "alcoholic degree," "alcoholic richness" and everything relating to alcoömetry refer to the French law relating to alcoömetry in which it is measured in volumes.

The results given in absolute alcohol by the hereinafter described apparatus, remain true whatever the system of alcoömetry employed, and it is possible to graduate the dial in ponderal degrees.

According to the definition of alcoholic richness itself, in order to attain the desired end it suffices to record at each revolution of the volant the number of hundredths of the volume measured per revolution corresponding to the alcoholic strength at the moment.

The alcoömeter is movable about an axis and moves along a scale divided into equal centesimal degrees. At each revolution of the volant a pointer concentric to the alcoömeter is brought back to zero and rests on the pointer of this latter, and the rotation of the independent needle is recorded on a ratchet wheel or other totalizer, this rotation being proportional to the pure alcohol passing. Finally, the degrees indicated by the alcoömeter must be corrected to allow for the influence of the temperature. One of the properties of graduation in equal degrees is to render the correction for temperature independent of the centesimal degree so that this correction can be made by moving by a suitable amount the zero of the scale, to which the pointer of the alcoömeter is brought back at each revolution of the volant. This displacement of the zero is obtained by means of a thermometric body.

The alcoömeter is movable about its axis and consists essentially of a plane surface passing through the axis and subject to the action of the liquid by its single upper face. The level of the liquid is always in the horizontal plane of the axis and the action of the liquid is balanced by a counter-weight fixed to the plane surface. In order to protect the lower face of this surface from the action of the liquid it is sufficient to add walls, upon which the only action produced is neutralized by the resistance of the bearings, in this way the alcoömeter may be given the form of a hollow torus T, dipping into a reservoir containing the liquid (Fig. 1), or the form of a torus-shaped vase *o. y. z.* containing the liquid. It will be seen that in both cases an element S of the plane *m—n* passing through O receives the same action from the liquid, equivalent to the weight of the column of liquid *s s'*.

The first type described below employs the torus-shape and the second the vase-shape.

Figure 4:
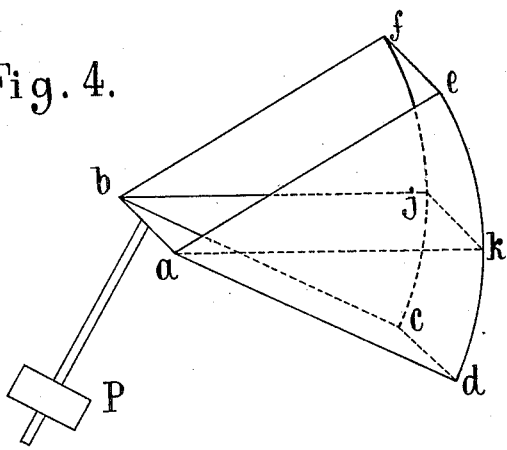
Figure 5:
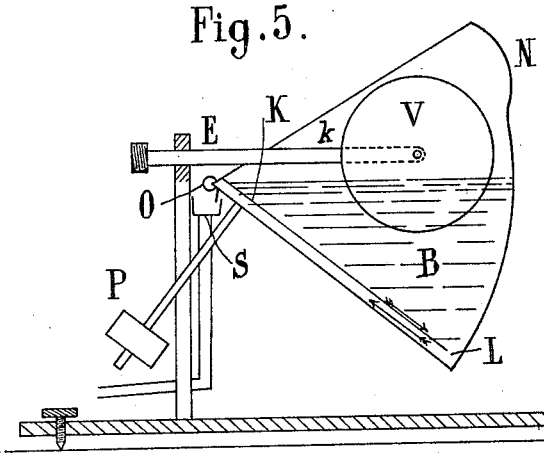
Figure 2:
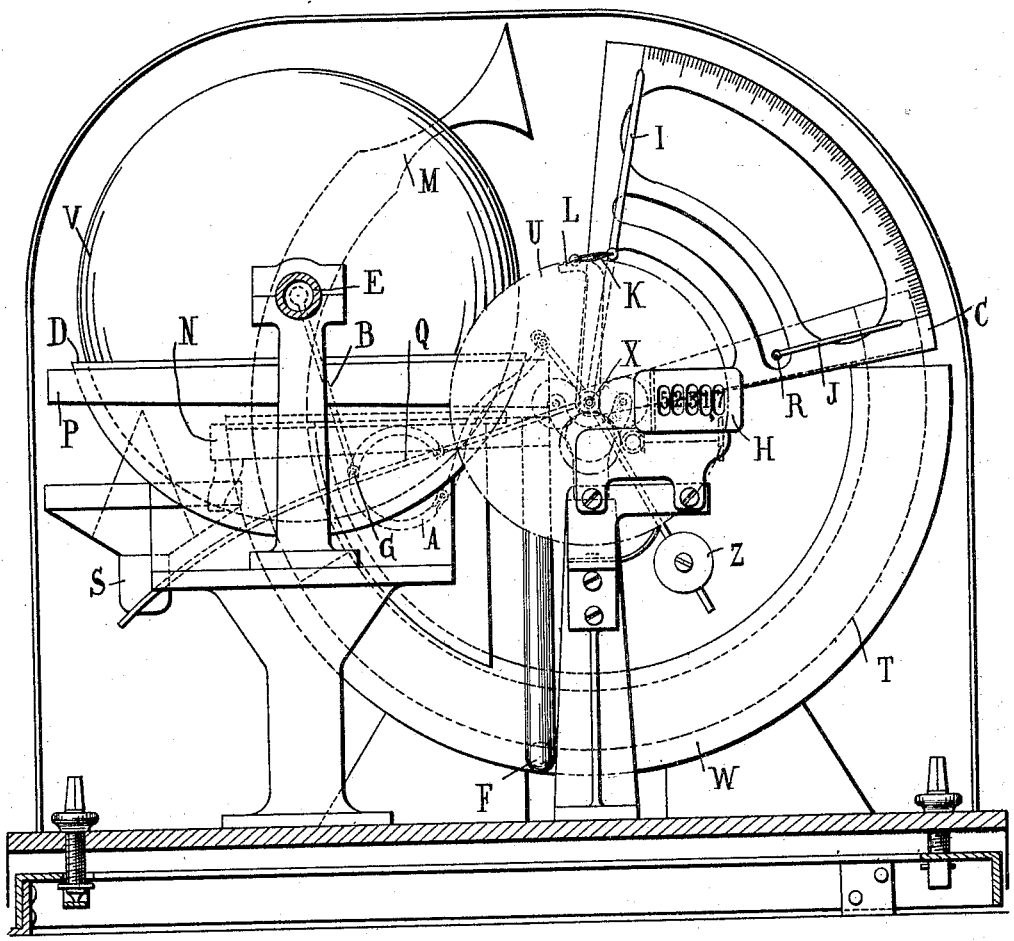
Figure 3:
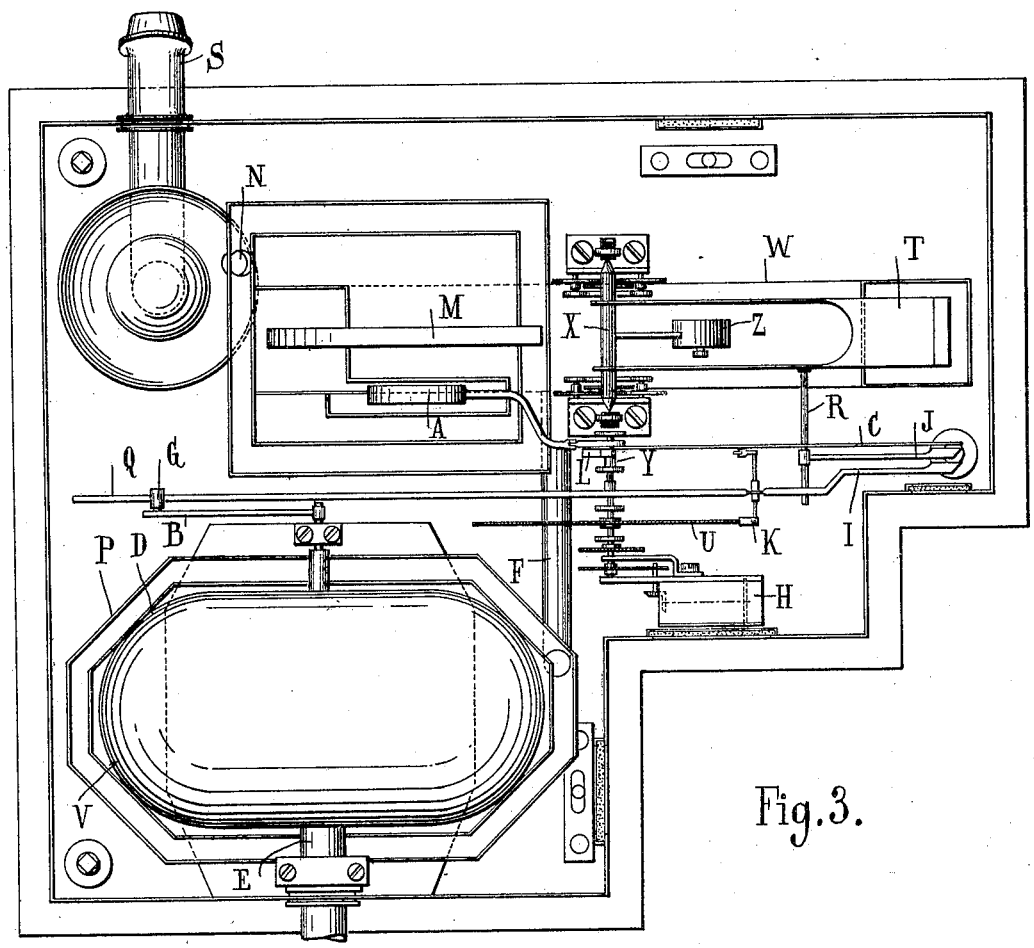

Figure 1 is a side elevation of the receptacle used in the first type of device above mentioned. Fig. 2 is an elevation and Fig. 3 a plan of an apparatus constructed according to the first type. Fig. 4 is a side elevation of the counterweighted receptacle used in the second type mentioned. Fig. 5 is a sectional view of the same as associated with the appropriate volant. Figs. 6 and 7 are side elevations of certain portions of the instrument shown in Figs. 2 and 3, hereinafter described. Figs. 8, and 9 are side elevations of certain parts as used in the second type of instrument. Fig. 10 is a plan view of the same. Fig. 11 shows a modification of the structure shown in Figs. 6 and 7 wherein the angular movement of the pointer is controlled.

The volant may be any one of the numerous known volumetric types, preferably rotating continuously and having constant velocity, so that at any instant, the volant turns by an amount equal to the volume passing. The volant V receives the liquid at its entrance E into the meter and pours it into an overflow receptacle D having a constant level, provided with an outlet P which receives the liquid and conducts it through F to the receptacle W of the alcoömeter T. The volant carries an arm B fitted with a roll G which abuts at each revolution against the tail Q of an independent pointer I oscillating about an axis situate in the prolongation of that of the float and resting at R on the pointer J of the alcoömeter. This movement brings J back to zero of the scale at each revolution. I carries a pawl K acting on the ratchet wheel U actuating the clockwork or counter H. The alcoömetric float T has the form of a torus whose cross-section at the center may have different forms. This float dips into a reservoir W of the same shape, and is movable about its axis of rotation X.

The torus is shown in Fig. 2 as having a flat bottom, this bottom being the active portion of the float as described above. In case the liquid circulating in the reservoir suddenly changes its composition, this flat bottom prevents the rapid renewal of the molecules of liquid immediately behind it; in practice the float is terminated by a conical portion or so as to have a decreasing cross-section. Experience shows that the balance of the float is not disturbed, the height of the decreasing portion being small relative to that of the column of liquid. The receptacle W receives the distillate at F and discharges it on the side near the bottom of the float at N which forms an enlargement of W and acts as a constant level overflow, being adjusted so as to lie in the horizontal plan of the axis X. Under these circumstances, theory shows that in order to obtain for different alcohols, positions of equilibrium for the float such that the scale shall have equal centesimal degrees, it will suffice to balance it by a counter-weight Z fixed on a rod attached to the axis. The position of the weight horizontally and vertically from the axis will be given by a calculation.

In order to increase the accuracy of the apparatus at low degrees the float is prolonged by a sword-shaped blade M whose end is shaped as shown. Alcoömetric accuracy is thus rendered constant from one end of the scale to the other. The float T carries the pointer J mentioned above which moves in front of the dial C. The organ for correcting temperature may be any thermometric body, bimetallic spiral, closed manometer tube, full of liquid, or a capsule filled with liquid. The manometer tube shown at A and lodged in an enlargement of the receptacle W, acts either upon the angle of rotation of the pointer, or as is the case here on the angle of engagement of the pawl K through the intermediary of an arm L movable about an axis Y in a prolongation of the axis X and connected to A by a crank and a connecting rod. The arm L lifts the pawl K before or after its passage to the centesimal zero, according as the temperature is above or below 15°.

The operation just described will best be understood by reference to Figs. 6 and 7, the former of which clearly shows certain parts obscured in the general view. The arm B revolves with the volant V and carries a roller G which impinges upon the arm Q once for each revolution of the volant. This causes the pointer I to revolve the ratchet wheel U by means of the pawl K which is pivotally mounted upon the pointer. The operation of the pawl and ratchet (and consequently of the counter H driven thereby) is suitably controlled and corrected in accordance with temperature changes by the use of a thermometer A situated in the enlargement B of the toric receptacle. (See also Fig. 3). This thermometer is fixed to the wall of the receptacle, and is connected by a link $h$ to the dial C which turns upon an axis concentric with that of the alcoömeter and carries the spring projection L. (See Fig. 3.) This projection is so placed as to move in the circular path of movement of the roller $z$ (Fig. 6) attached to the pawl K, and, when said roller reaches the projection L, it rides upon it, withdrawing the pawl from the teeth of the wheel U. By this means the thermometer A will determine the degree of movement of the wheel U for each operation of the pointer I, that is to say for each revolution of the volant V. In Fig. 11 is shown a modification wherein the actual angular movement of the pointer I is limited by the thermometer, for the same purpose. Here the stop L, instead of acting to remove the pawl K from the wheel U, serves to prevent further angular movement of the pointer I, by projecting into its path. At the same time continued movement of the arm B and roller G is permitted by the yielding of the arm Q, which is made suitably resilient. Finally the liquid leaving the toric receptacle W at N is collected in an outlet pipe S which is provided with baffle plates which hinder the fraudulent introduction into the meter of any object likely to check its action. The meter shown rests on a flat rigid base provided with levels and locking screws which are themselves connected to a frame which can be sealed or fixed in position, a close fitting cover protects the whole and is provided with windows through which the levels and dials may be observed.

The liquid can either pass through the alcoömetric receptacle or the volant first. In the case of apparatus constructed for large consumptions the passage into the receptacle of the torus of all the liquid which has passed through the volant, that is all the water consumed, would necessitate the receptacle, and especially the overflow having large dimensions; the periphery of the overflow in order to have a sufficiently large development would then be composed in plan by a series of zig-zag lines. This complication can be avoided by conducting directly to the outlet from the apparatus, and starting from the overflow of the volant, all the liquid above a certain amount, the necessary pipe being made to open into the channel of the overflow receptacle a little higher than the pipe conducting to the alcoömeter.

*Second type.*—This apparatus is based on the use of second form of alcoömeter, utilizing the same general property, namely a toric receptacle containing the liquid. The receptacle B (Fig. 4) is given the form of a toric segment *a, b, c, d, e, f,* generated by a rectangle *a, b, c, d* turning about one of its sides *a, b*. This receptacle is open along one of its sides *a, b, f, e,* and oscillates about the edge *ab*, which also forms the overflow edge so as to maintain the level *abjk* of the liquid in the horizontal plane of the axis *ab*. This receptacle is balanced (like the torus) by a counter weight P situate on an arm of a lever fixed to the receptacle. According to the above this receptacle forms, like the torus, an alcoömeter having equal degrees, and this is verified by experience. The portion of this receptacle corresponding to the end of the blade M of the torus (Fig. 2) has its cylindrical face slightly modified to follow an equivalent curve N (Fig. 5).

If it is remembered that the overflow receptacle of the volant of the first apparatus described has no other function than that of maintaining the level constant about the volant, and that this property is also met with in the alcoömeter receptacle B, it will be seen that this latter can be used as overflow receptacle for the volant, the latter being held by an independent support. This is shown in Fig. 5; the volant V is held fixed in position by two arms E, one of which forms the entrance for the liquid. These arms are arranged in such a manner as to allow the receptacle B every freedom of oscillation. The liquid after entering the volant is poured into the receptacle B which measures its alcoholic strength, and leaves this receptacle by the edge *o*, which coincides with its axle of oscillation, after having passed along the bottom as indicated by the arrow, a baffle plate K L intended to insure the continual renewal of all the liquid. A funnel S receives the liquid and leads it to the outlet from the apparatus.

The recording system employed in connection with this second type of apparatus is similar in construction to that already described, and will be best understood in connection with Figs. 8, 9 and 10.

In Figs. 8 and 10 is shown the thermometer A fixed to the interior of one of the walls of the oscillating receptacle B. This thermometer is connected by a link *h* to the pointer *j* of the alcoömeter. In order to pass over and beyond the wall of the receptacle B, the link is bent twice as shown in Fig. 10. It is pivotally connected to the pointer at *o*. The thermometer thus gives the pointer J positions depending upon the temperature, and the pointer may be made to mark the corrected alcoömetric degrees before a fixed dial.

As shown in Figs. 9 and 10, the volant V carries a rigid arm *r* having a roller G adapted to engage the pivoted arm Q at each revolution of the volant. This arm Q is counterbalanced by the weight P, and is rigidly connected with the independent pointer I which is movable, with Q, about an axis concentric with that of the alcoömeter. The arm or tail-piece Q is bent twice so as to pass over and beyond the wall of the recptacle B. The pointer I carries a pawl, *q*, engaging the teeth of a ratchet wheel U, which wheel drives a clockwork or counter (not shown) in a manner already described. The pointer I, if left to itself, rests against a projection on the pointer J. At each revolution of the volant, the roller G actuates the pointer I by means of the tail piece Q, and the parts are so proportioned that, at the end of each stroke, the pointer I comes exactly opposite the zero of the dial. Thus, in this form or modification, it is the departure and not the point of arrival of the pointer I which is corrected for temperature.

I claim:

1. In an alcoömeter the combination of a vessel containing the liquid, whose alcoholic strength is to be measured, a toric float immersed in said vessel, an axis supporting said float, means for maintaining the level of the liquid in the horizontal plane of the axis, a counterweight fixed to the float, a dial, and a pointer fixed to the float and moving in front of said dial, substantially as described.

2. In an alcoömeter of the class described, a rotary volumetric volant for receiving the liquid, a receptacle surrounding said volant and arranged to permit the liquid to overflow its horizontal edges, a channel surrounding said receptacle for receiving the overflow, an alcoömetric vessel communicating with said overflow, two bearings supporting the axis of the volant, one of which is hollow and serves to feed the liquid to the volant, an arm provided with a roller fixed to said volant, and indicating means actuated by said arm and roller, substantially as described.

3. In an alcoömeter of the class described, a float adapted to move around a fixed axis a pointer fixed to the float, an independent pointer oscillating about the same axis as the float and adapted to rest on the first named pointer, a volant, an arm having a roller fixed to the volant and adapted to act on each revolution upon the independent pointer in order to oscillate it, a pawl carried by the independent pointer, a ratchet wheel actuated by said pawl, and an indicator operated by said ratchet wheel, substantially as described.

4. In an alcoömeter of the class described, a vessel for containing the liquid, a thermometric body attached to said vessel within it, a dial movable about the same axis as the alcoömeter, a connection between the thermometric body and said dial, an independent pointer mounted concentrically with the alcoömeter, a pawl thereon, and means on said dial adapted to raise the pawl on the pointer at each passage of the latter before the zero of the dial, substantially as described.

5. In an alcoömeter, the combination of a vessel containing the liquid whose alcoholic strength is to be measured, a toric float immersed in said vessel, an axis supporting said float, means for maintaining the level of the liquid in the horizontal plane of the axis, a balance weight attached to said float, a pointer connected to the float a dial for said pointer, a ratchet mechanism, means connecting said pointer to said ratchet mechanism for operating the latter, indicating means actuated by said ratchet mechanism, and an inlet and an outlet to said vessel, substantially as described.

6. In an alcoömeter of the class described, a float, a pointer connected thereto a scale for indicating the alcoholic strength, a revoluble volant, an independent pointer adapted to rest on the first pointer, means for returning the same to the zero of the scale at each revolution of the volant, a totalizing system adapted to be driven by said independent pointer, and means for making such totalizing system inoperative when the pointer passes opposite the zero, substantially as described.

ETIENNE GIBAUDAN.
ALPHONSE JEAN FRAGER.

Witnesses:
H. C. COXE,
MAURICE H. PIGNET.

Copies of this patent may be obtained for five cents each, by addressing the "Commissioner of Patents, Washington, D. C."